(12) United States Patent
Kanai et al.

(10) Patent No.: US 7,381,499 B2
(45) Date of Patent: Jun. 3, 2008

(54) NONAQUEOUS ELECTROLYTE BATTERY

(75) Inventors: Kumiko Kanai, Kobe (JP); Masahisa Fujimoto, Osaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 171 days.

(21) Appl. No.: 10/962,401

(22) Filed: Oct. 13, 2004

(65) Prior Publication Data

US 2005/0048373 A1    Mar. 3, 2005

Related U.S. Application Data

(63) Continuation of application No. PCT/JP03/014093, filed on Nov. 5, 2003.

(30) Foreign Application Priority Data

| Nov. 8, 2002 | (JP) | ............................. 2002-325507 |
| May 9, 2003 | (JP) | ............................. 2003-131138 |
| Oct. 27, 2003 | (JP) | ............................. 2003-365386 |

(51) Int. Cl.
    *H01M 4/66* (2006.01)
(52) U.S. Cl. ...................... 429/245; 429/233; 429/234; 429/332
(58) Field of Classification Search ................. 429/245, 429/233, 234, 332
    See application file for complete search history.

(56) References Cited

U.S. PATENT DOCUMENTS

| 5,187,033 | A | * | 2/1993 | Koshiba ..................... 429/245 |
| 5,464,706 | A | * | 11/1995 | Dasgupta et al. ......... 429/218.1 |
| 6,099,989 | A | * | 8/2000 | Harada et al. .............. 429/213 |
| 6,551,743 | B1 | * | 4/2003 | Nakanishi et al. .......... 429/223 |
| 2004/0048157 | A1 | * | 3/2004 | Neudecker et al. ......... 429/245 |

FOREIGN PATENT DOCUMENTS

| JP | 6-80588 B2 | 10/1994 |
| JP | 6-333569 | * 12/1994 |
| JP | 7-70327 B2 | 7/1995 |
| JP | 2000-357517 | 12/2000 |
| JP | 2002-231224 | 8/2002 |

OTHER PUBLICATIONS

Chinese Office Action dated Mar. 9, 2007, issued in corresponding Chinese application No. 2003801026174.

* cited by examiner

*Primary Examiner*—Laura S Weiner
(74) *Attorney, Agent, or Firm*—Westerman, Hattori, Daniels & Adrian, LLP.

(57) ABSTRACT

A nonaqueous electrolyte battery whose electrolyte can be selected from a wider range of materials can be obtained. The nonaqueous electrolyte battery comprises a positive electrode, a negative electrode and a nonaqueous electrolytic solution. At least one of the positive and negative electrodes has a collector which includes a compound containing at least one element selected from the group consisting of transition metal elements, group III elements, group IV Elements, and group V elements.

3 Claims, 8 Drawing Sheets

(COMPARATIVE EXAMPLE 1-3)

FIG.10

(EXAMPLE 2-1)

NONAQUEOUS ELECTROLYTE BATTERY

This application is a continuation of international application PCT/JP03/014093 filed on Nov. 5, 2003.

TECHNICAL FIELD

The present invention relates to a nonaqueous electrolyte battery, and more particularly, it relates to a nonaqueous electrolyte battery having a collector.

BACKGROUND TECHNIQUE

In general, researches on an electrode active material, an electrolyte, a separator and a collector etc. are carried out as researches related to a nonaqueous electrolyte battery. Among these, many researches are carried out on the electrode active material, the electrolyte and the separator. In relation to the collector, the researches remain remarkably extremely partial since the material constituting the collector is limited to a metal or a semimetal due to the basic property that the collector must efficiently collect electricity generated in an electrode.

Al or the like, for example, is known as a metallic material satisfying this basic property necessary for the collector. A nonaqueous electrolyte battery employing Al foil as a collector with an electrode active material layer formed on the Al foil is known in general. This nonaqueous electrolyte battery is disclosed in Japanese Patent Publication No. 7-70327, for example.

The aforementioned conventional collector consisting of the Al foil has excellent collection performance, while the characteristic thereof inconveniently varies with the type of the employed electrolyte. When employing an organic electrolytic solution in which $LiPF_6$ is dissolved, for example, it is possible to use the collector at a high potential of 6 V. When employing an organic electrolytic solution in which a solute other than $LiPF_6$ is dissolved, however, it has been difficult to use the collector at a high potential since elution of the collector takes place at around 3.5 V. Particularly in an organic electrolytic solution in which $LiN(CF_3SO_2)_2$ or $LiN(C_2F_5SO_2)_2$ is dissolved, collection itself has been difficult since elution of Al which is the element constituting the collector increases. Consequently, there has been such a problem that it is difficult to widen the selection range for electrolytes when employing Al foil as the collector since there are a large number of electrolytes which are difficult to use.

DISCLOSURE OF THE INVENTION

An object of the present invention is to provide a nonaqueous electrolyte battery capable of widening the selection range for electrolytes.

Another object of the present invention is to easily obtain a chemically stable collector in the aforementioned nonaqueous electrolyte battery.

In order to attain the aforementioned objects, the inventor has assiduously carried out researches, to find that excellent collection performance can be attained in relation to a plurality of types of electrolytes by employing a compound containing a transition metal element and at least one element among the groups 3, 4 and 5.

In other words, a nonaqueous electrolyte battery according to an aspect of the present invention comprises a positive electrode, a negative electrode and a nonaqueous electrolytic solution, and a collector of at least either the positive electrode or the negative electrode includes a compound containing a transition metal element and at least one element among the groups 3, 4 and 5.

In the nonaqueous electrolyte battery according to this aspect, as hereinabove described, the collector of at least either the positive electrode or the negative electrode is so constituted to include the transition metal element and at least one element among the groups 3, 4 and 5 that a collector having excellent collection performance stable in a wide potential range can be obtained in relation to a plurality of types of electrolytes since the compound containing the transition metal element and at least one element among the groups 3, 4 and 5 has conductivity and is chemically inert. Further, it is possible to employ an electrolyte such as $LiN(CF_3SO_2)_2$ or $LiN(C_2F_5SO_2)_2$, for example, difficult to use in the conventional collector consisting of Al foil, whereby the selection range for electrolytes can be widened.

In the nonaqueous electrolyte battery according to the aforementioned aspect, at least one element among the groups 3, 4 and 5 contained in the compound is preferably nitrogen (N), and the compound is preferably an interstitial nitride. According to this structure, a chemically stable collector can be easily obtained since the interstitial nitride is a chemically stable substance.

In the nonaqueous electrolyte battery according to the aforementioned aspect, the transition metal element contained in the compound is preferably titanium (Ti). According to this structure, a chemically stable collector consisting of TiN which is an interstitial nitride can be obtained. TiN, which is a material used as a barrier metal, is an extremely preferable material for obtaining a chemically stable collector.

In this case, at least one solute in $LiN(CF_3SO_2)_2$ and $LiN(C_2F_5SO_2)_2$ is preferably dissolved in the nonaqueous electrolyte. In this nonaqueous electrolytic solution, the collector consisting of TiN, capable of obtaining performance particularly chemically stable, can be utilized as a more chemically stable collector.

In the nonaqueous electrolyte battery according to the aforementioned aspect, the transition metal element contained in the compound is preferably zirconium (Zr). According to this structure, a chemically stable collector consisting of ZrN which is an interstitial nitride can be obtained. ZrN, which is a material used as a barrier metal, is an extremely preferable material for obtaining a chemically stable collector.

In this case, at least one solute among $LiN(C_2F_5SO_2)_2$, $LiPF_6$ and $LiBF_4$ is preferably dissolved in the nonaqueous electrolyte. In this nonaqueous electrolytic solution, the collector consisting of ZrN, capable of obtaining performance particularly chemically stable, can be utilized as a more chemically stable collector.

In the nonaqueous electrolyte battery according to the aforementioned aspect, the transition metal element contained in the compound is preferably tantalum (Ta). According to this structure, a chemically stable collector consisting of TaN which is an interstitial nitride can be obtained. TaN, which is a material used as a barrier metal, is an extremely preferable material for obtaining a chemically stable collector.

In this case, the nonaqueous electrolytic solution preferably includes a nonaqueous electrolytic solution in which $LiPF_6$ employed as a solute is dissolved. In this nonaqueous electrolytic solution, the collector consisting of TaN, capable of obtaining performance particularly chemically stable, can be utilized as a more chemically stable collector.

In the aforementioned case, the nonaqueous electrolytic solution may include a mixed solvent of ethylene carbonate and diethyl carbonate employed as solvents.

In the aforementioned nonaqueous electrolyte battery, the compound containing the transition metal element and at least one element among the groups 3, 4 and 5 is preferably filmily formed. When filmily forming the generally powdery compound containing the transition metal element and at least one element among the groups 3, 4 and 5 in this manner, the same can be formed in a similar thickness to metallic foil generally used as a collector, whereby the compound containing the transition metal element and at least one element among the groups 3, 4 and 5 can be easily employed as the collector.

In this case, the compound containing the transition metal element and at least one element among the groups 3, 4 and 5 is preferably filmily formed by sputtering. According to this structure, the compound containing the transition metal element and at least one element among the groups 3, 4 and 5 can be easily filmily formed.

In the aforementioned structure that the compound is filmily formed, the compound containing the transition metal element and at least one element among the groups 3, 4 and 5 is preferably formed on a filmy substrate. According to this structure, the filmy substrate is rich in flexibility and hence the collector formed on the filmy substrate is also rich in flexibility. Thus, an easily deformable battery electrode can be formed.

In this case, the filmy substrate preferably consists of polyimide. According to this structure, a filmy substrate excellent not only in flexibility but also in heat resistance can be obtained.

In the aforementioned nonaqueous electrolyte battery, the collector may be the collector of the positive electrode.

In the nonaqueous electrolyte battery according to the aforementioned aspect, the compound containing the transition metal element and at least one element among the groups 3, 4 and 5 is preferably any one selected from a group consisting of TiN, ZrN and TaN. According to this structure, a chemically stable collector consisting of TiN, ZrN or TaN which is an interstitial nitride can be obtained. TiN, ZrN or TaN, which is a material used as a barrier metal, is an extremely preferable material for obtaining a chemically stable collector.

BEST MODES FOR CARRYING OUT THE INVENTION

Examples of the present invention are now specifically described.

EXAMPLE 1-1 TO EXAMPLE 1-5

[Preparation of Collector (Positive Electrode)]

The structure of a sputtering apparatus employed in Examples 1-1 to 1-5 is first described with reference to FIG. 1. This sputtering apparatus comprises a vacuum chamber 1, a water-cooled rotating drum 2 rotatably supported in the vacuum chamber 1, a target 3 set to be opposite to the water-cooled rotating drum 2, a high-frequency power source 4 for supplying high-frequency power to the target 3, an Ar gas introduction valve 5a for introducing Ar gas into the vacuum chamber 1, an $N_2$ gas introduction valve 5b for introducing $N_2$ gas into the vacuum chamber 1, and an evacuation valve 6 for controlling the degree of vacuum in the vacuum chamber 1.

Figure 1:
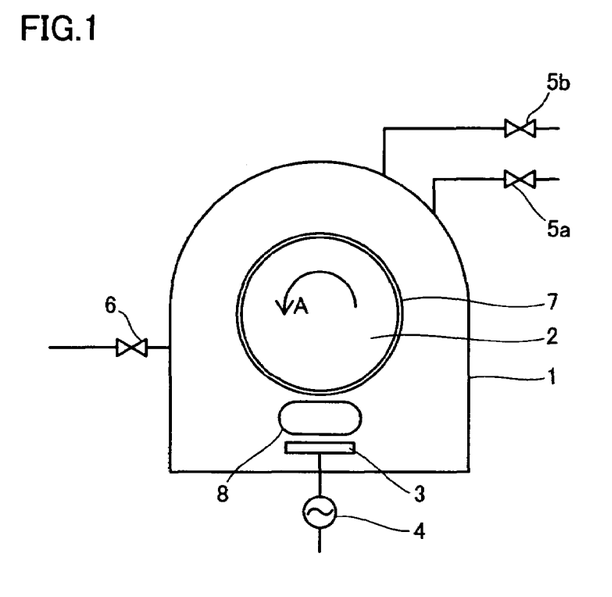
FIG. 1 is a schematic diagram showing a sputtering apparatus used for preparing collectors of positive electrodes employed in common for nonaqueous electrolyte batteries according to Examples 1-1 to 1-5 of the present invention.

When preparing each of collectors employed in common for nonaqueous electrolyte batteries according to Examples 1-1 to 1-5, a substrate 7 consisting of a polyimide film (Kapton 70V by Du Pont-Toray Co., Ltd.) was set on the water-cooled rotating drum 2 as shown in FIG. 1, while a TiN film was formed on the substrate 7 under conditions shown in the following Table 1:

TABLE 1

| Working Gas Flow Rate | Ar: 50 (sccm) |
| --- | --- |
| | $N_2$: 5 (sccm) |
| Working Gas Pressure | 0.18 (Pa) |
| High-Frequency Power | 200 (W) |
| Formation Time | 180 (min) |

Referring to the above Table 1, the forming conditions for the TiN films employed in common for Examples 1-1 to 1-5 are working gas (atmospheric gas) flow rates: Ar gas (50 sccm) and $N_2$ gas (5 sccm) consisting of N (nitrogen) which is a group 5 element, working gas pressure: 0.18 Pa, high-frequency power applied to target: 200 W and formation time: 180 min. N (nitrogen) is an example of "at least one element among the groups 3, 4 and 5" in the present invention.

When preparing each of the collectors employed in common for Examples 1-1 to 1-5, a substance prepared by molding Ti metal containing Ti (titanium) which is a transition metal element by 99.9% was employed as the target 3 while the distance between the target 3 and the substrate 7 was set to 6 cm. Ti (titanium) is an example of the "transition metal element" in the present invention. The thickness of the substrate 7 consisting of a polyimide film was set to 17.5 μm, while the thickness of the TiN film formed on the substrate 7 was set to 0.3 μm.

As a specific preparation process, the evacuation valve 6 is opened for evacuating the vacuum chamber 1 shown in FIG. 1. When reaching ultimate vacuum, Ar gas (50 sccm) and $N_2$ gas (5 sccm) were introduced through the Ar gas introduction valve 5a and the $N_2$ gas introduction valve 5b, and the opening of the evacuation valve 6 was adjusted to obtain the pressure of 0.18 Pa. The high-frequency power source 4 supplied high-frequency power (200 W) to the target 3 (Ti metal), thereby generating plasma 8. Thus, ions in the plasma 8 collide with the surface of the target 3, for knocking out atoms (Ti) constituting the target 3. In this state, a TiN film (not shown) having a thickness of 0.3 μm was formed on the substrate 7 by rotating the water-cooled rotating drum 2 on which the substrate 7 consisting of a polyimide film was set along arrow A. TiN is an example of the "compound" and the "interstitial nitride" in the present invention. The substrate 7 and the TiN film were cut out into the form of a flag having a terminal part taking collection and a square part of 2 cm square and thereafter dried in vacuum at 110° C. for 2 hours, thereby preparing the collector of the positive electrode employed in common for nonaqueous electrolyte batteries according to Examples 1-1 to 1-5.

COMPARATIVE EXAMPLE 1-1 TO COMPARATIVE EXAMPLE 1-3

[Preparation of Collector (Positive Electrode)]
Collectors of positive electrodes employed in common for nonaqueous electrolyte batteries according to comparative examples 1-1 to 1-3 were prepared by molding Al foil.

EXAMPLE 1-1 TO EXAMPLE 1-5 AND COMPARATIVE EXAMPLE 1-1 TO COMPARATIVE EXAMPLE 1-3

Then, the following cyclic voltammetry measurement was performed in order to investigate differences of performance responsive to combinations of the collectors according to Examples 1-1 to 1-5 prepared in the aforementioned manner and comparative examples 1-1 to 1-3 prepared in the aforementioned manner and electrolytic solutions:

[Cyclic Voltammetry Measurement]
In this cyclic voltammetry measurement, the aforementioned collectors (positive electrodes) prepared according to Examples 1-1 to 1-5 and comparative examples 1-1 to 1-3 were employed as working electrodes, while substances prepared by molding Li metal were employed as counter electrodes (negative electrodes) and reference electrodes.

As the electrolytic solutions, substances prepared by dissolving $LiN(CF_3SO_2)_2$ in constant-volume mixed solvents (EC/DEC (1/1)) of ethylene carbonate (EC) and diethyl carbonate (DEC) to have concentration of 1 mol/liter were employed in Example 1-1 and comparative example 1-1.

In Example 1-2 and comparative example 1-2, substances prepared by dissolving $LiN(C_2F_5SO_2)_2$ in EC/DEC (1/1) to have concentration of 1 mol/liter were employed as the electrolytic solutions.

In Example 1-4, a substance prepared by dissolving $LiCF_3SO_3$ in EC/DEC (1/1) to have concentration of 1 mol/liter was employed as the electrolytic solution.

In Example 1-5, a substance prepared by dissolving $LiBF_4$ in EC/DEC (1/1) to have concentration of 1 mol/liter was employed as the electrolytic solution.

Oxidation currents flowing between the working electrodes consisting of TiN or Al and the counter electrodes consisting of Li were measured by oxidation taking place in the working electrodes consisting of TiN or AlN when scanning potentials with reference potentials (V vs. $Li/Li^+$) of the reference electrodes consisting of Li. The potential scanning ranges were set to natural potential to 6 V vs. $Li/Li^+$ in Examples 1-1, 1-2, 1-4 and 1-5 and comparative example 1-2. The potential scanning range was set to natural potential to 5 V vs. $Li/Li^+$ in Example 1-3. The potential scanning range was set to natural potential to 4.7 V vs. $Li/Li^+$ in comparative example 1-1. The potential scanning range was set to natural potential to 3 V vs. $Li/Li^+$ in comparative example 1-3. Starts of scanning were set to directions of oxidation (directions for increasing the potentials). Thereafter the potentials were scanned in directions of reduction (directions for reducing the potentials). Results of this cyclic voltammetry measurement are shown in FIGS. 2 to 9.

Figure 5:
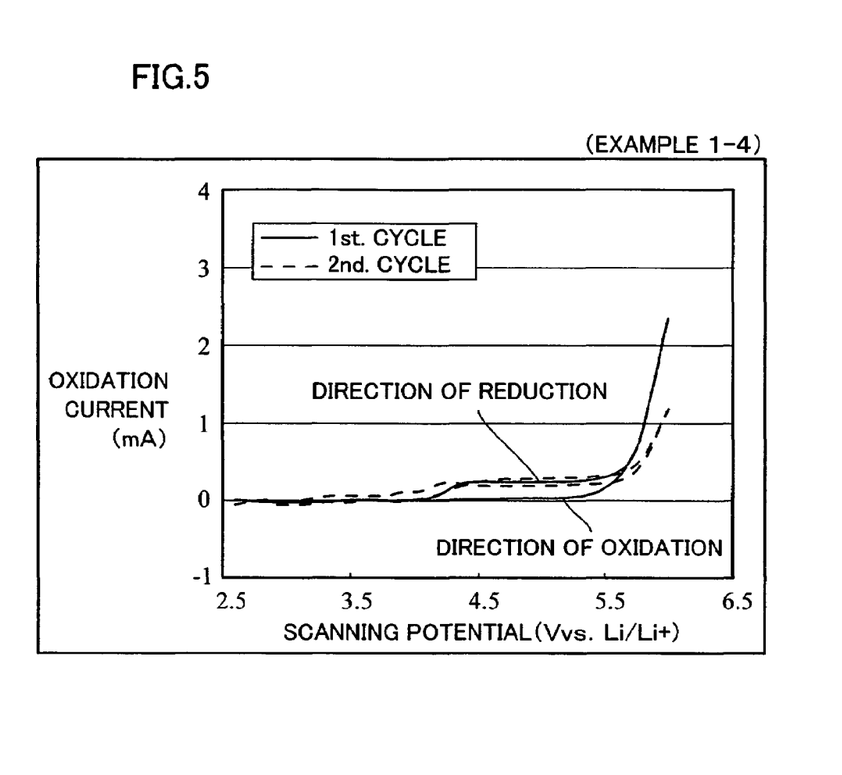
FIG. 5 is a cyclic voltammogram showing the relation between a scanning potential and an oxidation current according to inventive Example 1-4.
Figure 6:
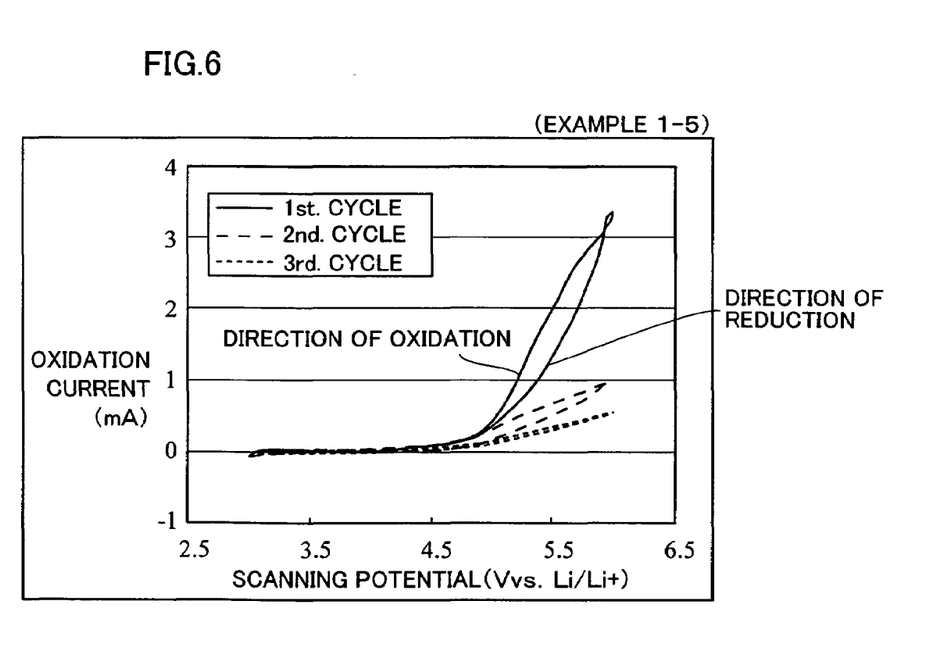
FIG. 6 is a cyclic voltammogram showing the relation between a scanning potential and an oxidation current according to inventive Example 1-5.
Figure 7:
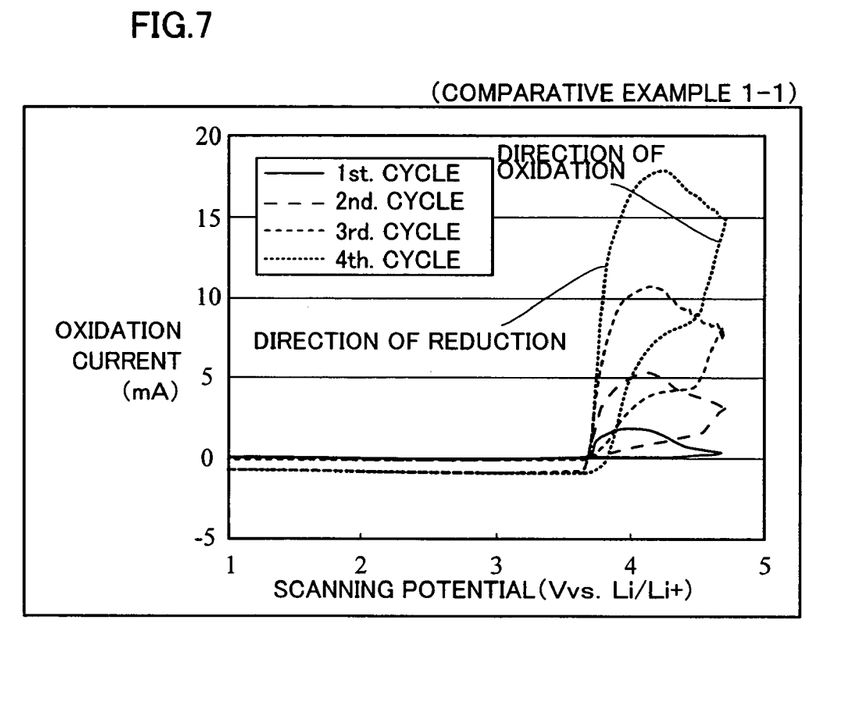
FIG. 7 is a cyclic voltammogram showing the relation between a scanning potential and an oxidation current according to comparative example 1-1.
Figure 8:
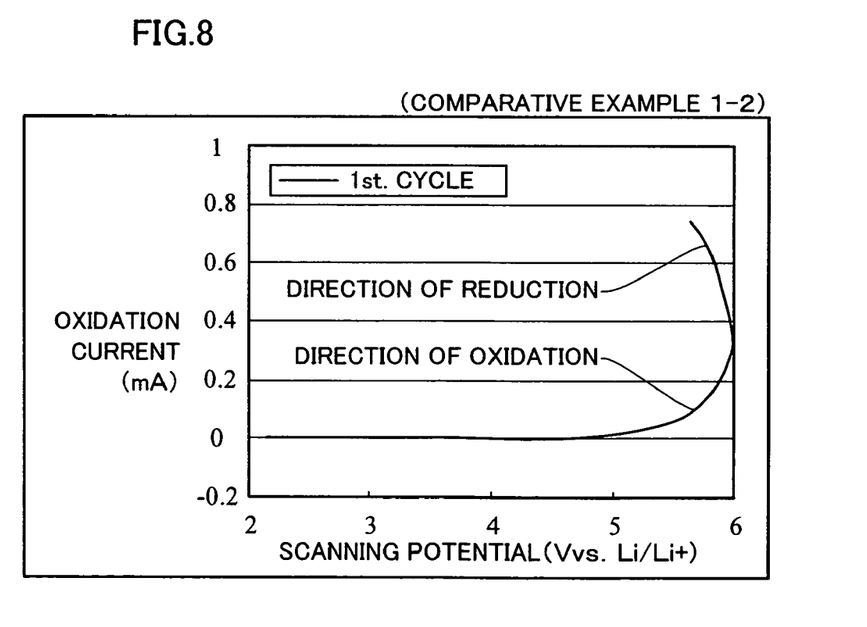
FIG. 8 is a cyclic voltammogram showing the relation between a scanning potential and an oxidation current according to comparative example 1-2.
Figure 9:
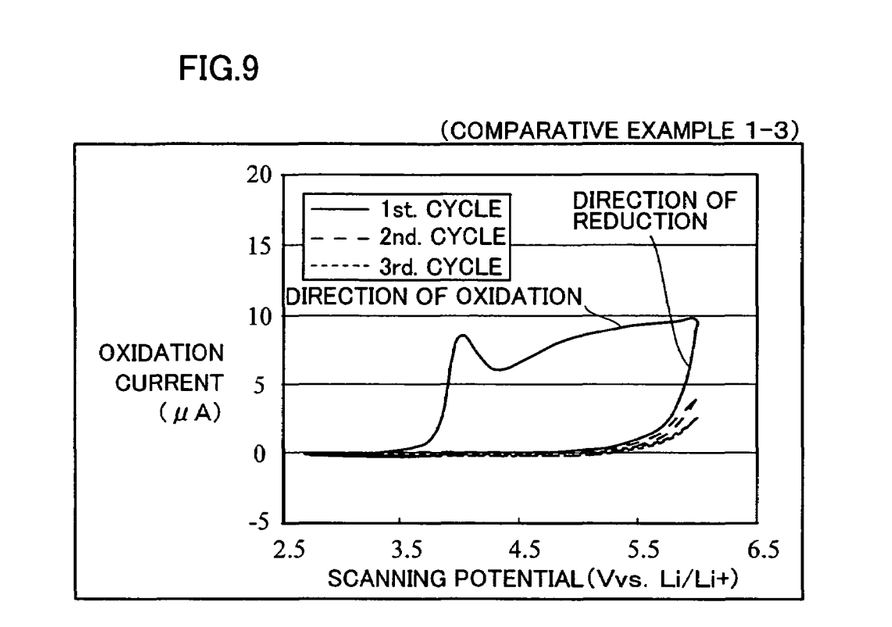
FIG. 9 is a cyclic voltammogram showing the relation between a scanning potential and an oxidation current according to comparative example 1-3.

In other words, cyclic voltammograms showing the relations between scanning potentials and oxidation currents according to inventive Examples 1-1 to 1-5 are shown in FIGS. 2 to 6 respectively, and cyclic voltammograms showing the relations between the scanning potentials and the oxidation currents according to comparative examples 1-1 to 1-3 are shown in FIGS. 7 to 9 respectively.

Figure 2:
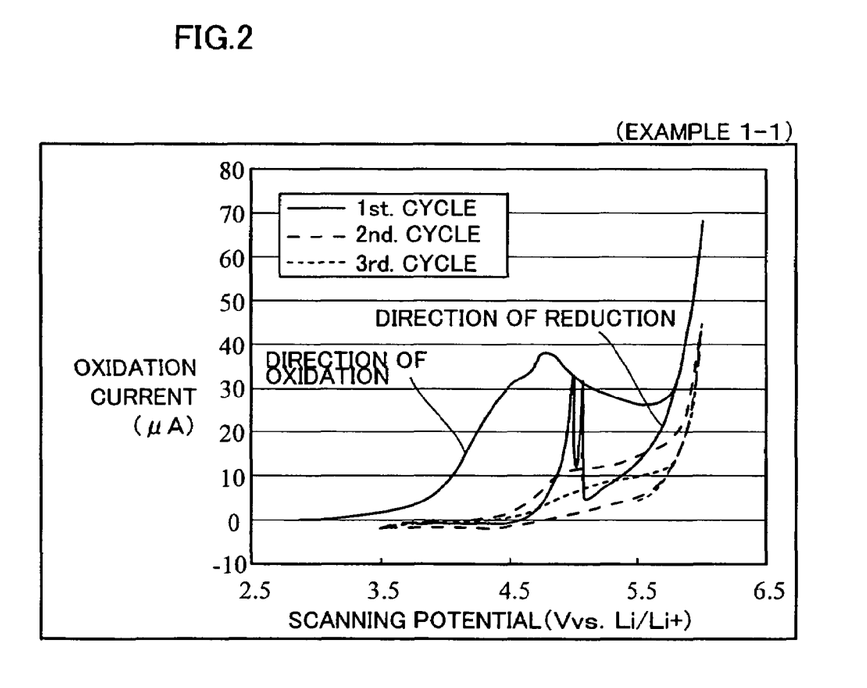
FIG. 2 is a cyclic voltammogram showing the relation between a scanning potential and an oxidation current according to inventive Example 1-1.
Figure 3:
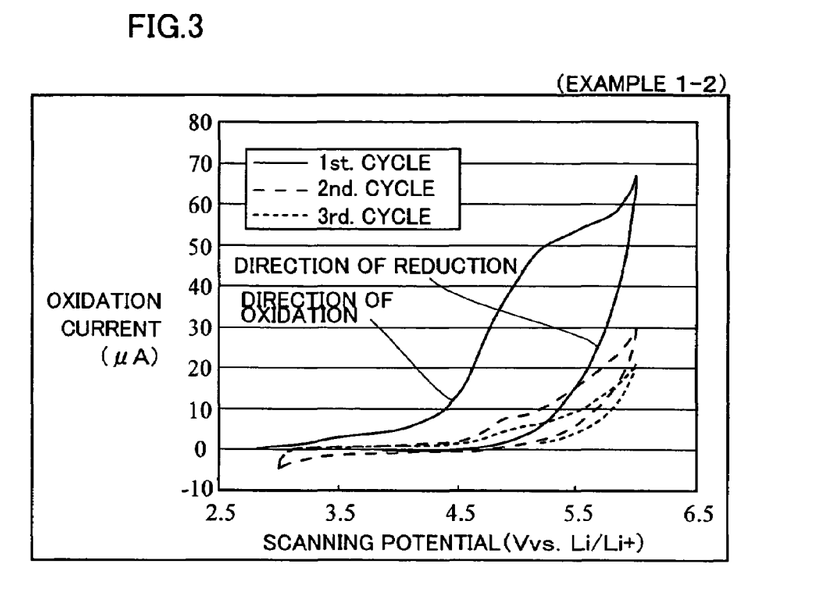
FIG. 3 is a cyclic voltammogram showing the relation between a scanning potential and an oxidation current according to inventive Example 1-2.

Referring to FIGS. 2 and 3, it has been proved that the values of the oxidation currents decrease in proportion to the cycles in Example 1-1 which is the combination of the electrolytic solution consisting of EC/DEC in which $LiN(CF_3SO_2)_2$ is dissolved and the collector consisting of the TiN film and Example 1-2 which is the combination of the electrolytic solution consisting of EC/DEC in which $LiN(C_2F_5SO_2)_2$ is dissolved and the collector consisting of the TiN film. This is conceivably because the surface of each collector was covered with an inert substance in the first cycle and the oxidation current hardly flowed in measurement in second and subsequent cycles. It can be said from this result that the TiN film constituting the collector is hardly eluted in the electrolytic solution consisting of EC/DEC in which $LiN(CF_3SO_2)_2$ or $LiN(C_2F_5SO_2)_2$ is dissolved. Thus, it has been proved that the combination of the TiN film employed as the collector and the electrolytic solution consisting of EC/DEC in which $LiN(CF_3SO_2)_2$ or $LiN(C_2F_5SO_2)_2$ is dissolved can be used at a high potential of 6 V.

Figure 4:
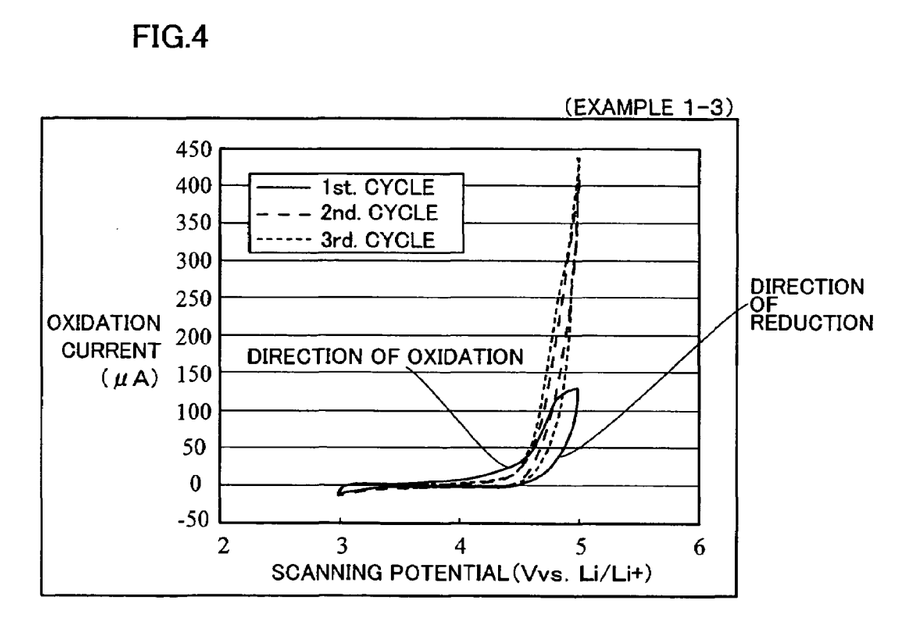
FIG. 4 is a cyclic voltammogram showing the relation between a scanning potential and an oxidation current according to inventive Example 1-3.

Referring to FIG. 4, it has been proved that the value of the oxidation current increases in proportion to the cycles in Example 1-3 which is the combination of the electrolytic solution consisting of EC/DEC in which $LiPF_6$ is dissolved and the collector consisting of the TiN film. This is conceivably because the collector was so diluted in the electrolytic solution that the oxidized surface area of the collector increased in proportion to the cycles and hence the flowing oxidation current increased. It can be said from this result that the TiN film constituting the collector is eluted in the electrolytic solution consisting of EC/DEC in which $LiPF_6$ is dissolved. When the scanning potential is not more than 4 V vs. $Li/Li^+$, however, the oxidation current hardly flows. Thus, the combination of the TiN film employed as the collector and the electrolytic solution consisting of EC/DEC in which $LiPF_6$ is dissolved can conceivably be used at a potential of not more than 4 V.

Referring to FIG. 5, it has been proved that the value of the oxidation current decreases in proportion to the cycles while the value of the oxidation current in the direction of reduction (direction reducing the potential) exceeds the value of the oxidation current in the direction of oxidation (direction increasing the potential) in Example 1-4 which is the combination of the electrolytic solution consisting of EC/DEC in which $LiCF_3SO_3$ is dissolved and the collector consisting of the TiN film. This is conceivably because the collector was so eluted in the electrolytic solution that the oxidized surface area of the collector increased at the time of scanning the potential in the direction of reduction as compared with the time of scanning the potential in the direction of oxidation to facilitate the flow of the oxidation current. It can be said from this result that the TiN film constituting the collector is eluted in the electrolytic solution consisting of EC/DEC in which $LiCF_3SO_3$ is dissolved. When the scanning potential is not more than 4 V vs. $Li/Li^+$, however, the oxidation current hardly flows. Thus, the combination of the TiN film employed as the collector and the electrolytic solution consisting of EC/DEC in which $LiCF_3SO_3$ is dissolved can conceivably be used at a potential of not more than 4 V.

Referring to FIG. 6, it has been proved that the value of the oxidation current decreases in proportion to the cycles while the value of the oxidation current reaches the order of mA and increases to 3.4 mA at the maximum when the scanning potential exceeds 4.5 V vs. $Li/Li^+$ in Example 1-5 which is the combination of the electrolytic solution consisting of EC/DEC in which $LiBF_4$ is dissolved and the collector consisting of the TiN film. It can be said from this result that the TiN film constituting the collector is easily eluted in the electrolytic solution consisting of EC/DEC in which $LiBF_4$ is dissolved when the potential exceeds 4.5 V vs. $Li/Li^+$. When the scanning potential is not more than 4.5 V vs. $Li/Li^+$, however, the oxidation current hardly flows. Thus, the combination of the TiN film employed as the collector and the electrolytic solution consisting of EC/DEC in which $LiBF_4$ is dissolved can conceivably be used at a potential of not more than 4.5 V.

Referring to FIG. 7, it has been proved that the value of the oxidation current increases while the value of the oxidation current in the direction of reduction exceeds the value of the oxidation current in the direction of oxidation in proportion to the cycles and the value of the oxidation current extremely increases to 18 mA at the maximum when exceeding 3.5 V vs. $Li/Li^+$ in comparative example 1-1 which is the combination of the electrolytic solution consisting of EC/DEC in which $LiN(CF_3SO_2)_2$ is dissolved and the collector consisting of the Al foil. It can be said from this result that the Al foil constituting the collector is extremely easily eluted in the electrolytic solution consisting of EC/DEC in which $LiN(CF_3SO_2)_2$ is dissolved. Therefore, it is conceivably difficult to use the combination of the Al foil employed as the collector and the electrolytic solution consisting of EC/DEC in which $LiN(CF_3SO_2)_2$ is dissolved at a potential of at least 3.5 V.

Referring to FIG. 8, it has been proved that the value of the oxidation current in the direction of reduction exceeds the value of the oxidation current in the direction of oxidation in comparative example 1-2 which is the combination of the electrolytic solution consisting of EC/DEC in which $LiN(C_2F_5SO_2)_2$ is dissolved and the collector consisting of the Al foil. It can be said from this result that the Al foil constituting the collector is extremely easily diluted in the electrolytic solution consisting of EC/DEC in which $LiN(C_2F_5SO_2)_2$ is dissolved. Further, the collector is so eluted that the oxidized surface area of the collector increases, and hence elution of the collector conceivably further increases in proportion to the cycles. Thus, it is conceivably difficult to use the combination of the Al foil employed as the collector and the electrolytic solution consisting of EC/DEC in which $LiN(C_2F_5SO_2)_2$ is dissolved.

Referring to FIG. 9, it has been proved that the value of the oxidation current decreases in proportion to the cycles in comparative example 1-3 which is the combination of the electrolytic solution consisting of EC/DEC in which $LiPF_6$ is dissolved and the collector consisting of the Al foil. It can be said from this result that the Al foil constituting the collector is hardly eluted in the electrolytic solution consisting of EC/DEC in which $LiPF_6$ is dissolved.

From the results of comparative examples 1-1 to 1-3 shown in FIGS. 7 to 9, it is possible to use the Al foil employed as the collector in combination with the electrolytic solution consisting of EC/DEC in which $LiPF_6$ is dissolved, while it is difficult to use the Al foil employed as the collector in combination with the electrolytic solution consisting of EC/DEC in which $LiN(CF_3SO_2)_2$ or $LiN(C_2F_5SO_2)_2$ is dissolved.

According to each of Examples 1-1 to 1-5, as hereinabove described, the collector of the positive electrode is so constituted of the TiN film that it is possible to obtain a collector having excellent collection performance stable in a wide potential range in relation to a plurality of types of electrolytes since TiN containing Ti (titanium) which is a transition metal element and N (nitrogen) which is a group 5 element has conductivity and is chemically inert. Further, it is possible to employ an electrolyte such as $LiN(CF_3SO_2)_2$ or $LiN(C_2F_5SO_2)_2$ difficult to use in the conventional collector consisting of Al foil, whereby the selection range for electrolytes can be widened. In addition, a chemically stable collector can be easily obtained since TiN is a chemically stable interstitial nitride.

In the preparation process for each of the collectors employed in common for the nonaqueous electrolyte batteries according to Examples 1-1 to 1-5, as hereinabove described, the generally powdery compound containing Ti (titanium) which is a transition metal element and N (nitrogen) which is a group 5 element is so filmily formed that the same can be formed in a similar thickness to metallic foil generally used as a collector, whereby the compound containing Ti which is a transition metal element and N which is a group 5 element can be easily employed as the collector. Further, sputtering is so employed that the quantity of impurities contained in the collector can be reduced and adhesion between the substrate 7 and the collector can be improved as compared with a case of forming the collector on the substrate by application. In addition, the collector is so formed on the substrate 7 consisting of the polyimide film that the collector formed on the substrate 7 is also rich in flexibility since the polyimide film is rich in flexibility. Thus, an easily deformable positive electrode for a nonaqueous electrolyte battery can be formed. Further, the polyimide film is so excellent in heat resistance that deterioration of the substrate 7 consisting of the polyimide film can be suppressed also when the substrate temperature rises in formation of the TiN film.

EXAMPLE 2-1 TO EXAMPLE 2-5

[Preparation of Collector (Positive Electrode)]

In Examples 2-1 to 2-5, collectors of positive electrodes employed in common for nonaqueous electrolyte batteries according to Examples 2-1 to 2-5 were prepared by sputtering similar to that in the aforementioned Examples 1-1 to 1-5. In each of Examples 2-1 to 2-5, however, a ZrN film having a thickness of 0.3 μm was formed on a substrate 7 (see FIG. 1) consisting of a polyimide film under conditions shown in the following Table 2. ZrN is an example of the "compound" and the "interstitial nitride" in the present invention.

TABLE 2

| Working Gas Flow Rate | Ar: 50 (sccm) |
| --- | --- |
|  | $N_2$: 3 (sccm) |
| Working Gas Pressure | 0.18 (Pa) |
| High-Frequency Power | 200 (W) |
| Formation Time | 120 (min) |

Referring to the above Table 2, the forming conditions for the ZrN films employed in common for Examples 2-1 to 2-5 are working gas (atmospheric gas) flow rates: Ar gas (50 sccm) and $N_2$ gas (5 sccm) consisting of N (nitrogen) which is a group 5 element, working gas pressure: 0.18 Pa, high-frequency power applied to target: 200 W and formation time: 120 min. When preparing each of the collectors employed in common for Examples 2-1 to 2-5, a substance prepared by molding Zr metal containing Zr (zirconium) which is a transition metal element by 99.9% was employed as a target 3 (see FIG. 1). Zr (zirconium) is an example of the "transition metal element" in the present invention.

Then, the following cyclic voltammetry measurement was performed in order to investigate differences of performance responsive to combinations of the collectors according to Examples 2-1 to 2-5 prepared in the aforementioned manner and electrolytic solutions:

[Cyclic Voltammetry Measurement]

In these Examples 2-1 to 2-5, similar cyclic voltammetry measurement to the aforementioned Examples 1-1 to 1-5 was performed. In other words, the collectors (positive electrodes) prepared according to the aforementioned Examples 2-1 to 2-5 were employed as working electrodes, while substances prepared by molding Li metal were employed as counter electrodes (negative electrodes) and reference electrodes.

As the electrolytic solution, a substance prepared by dissolving $LiN(CF_3SO_2)_2$ in a constant-volume mixed solvent (EC/DEC (1/1)) of ethylene carbonate (EC) and diethyl carbonate (DEC) to have concentration of 1 mol/liter was employed in Example 2-1, similarly to the aforementioned Example 1-1.

In Example 2-2, a substance prepared by dissolving $LiN(C_2F_5SO_2)_2$ in EC/DEC (1/1) to have concentration of 1 mol/liter was employed as the electrolytic solution, similarly to the aforementioned Example 1-2.

In Example 2-3, a substance prepared by dissolving $LiPF_6$ in EC/DEC (1/1) to have concentration of 1 mol/liter was employed as the electrolytic solution, similarly to the aforementioned Example 1-3.

In Example 2-4, a substance prepared by dissolving $LiCF_3SO_3$ in EC/DEC (1/1) to have concentration of 1 mol/liter was employed as the electrolytic solution, similarly to the aforementioned Example 1-4.

In Example 2-5, a substance prepared by dissolving $LiBF_4$ in EC/DEC (1/1) to have concentration of 1 mol/liter was employed as the electrolytic solution, similarly to the aforementioned Example 1-5.

The potential scanning range was set to natural potential to V vs. $Li/Li^+$, and oxidation currents flowing between the working electrodes consisting of ZrN and the counter electrodes consisting of Li were measured. Results of this cyclic voltammetry measurement are shown in FIGS. 10 to 14.

In other words, cyclic voltammograms showing the relations between scanning potentials and oxidation currents according to inventive Examples 2-1 to 2-5 are shown in FIGS. 10 to 14 respectively.

Figure 10:
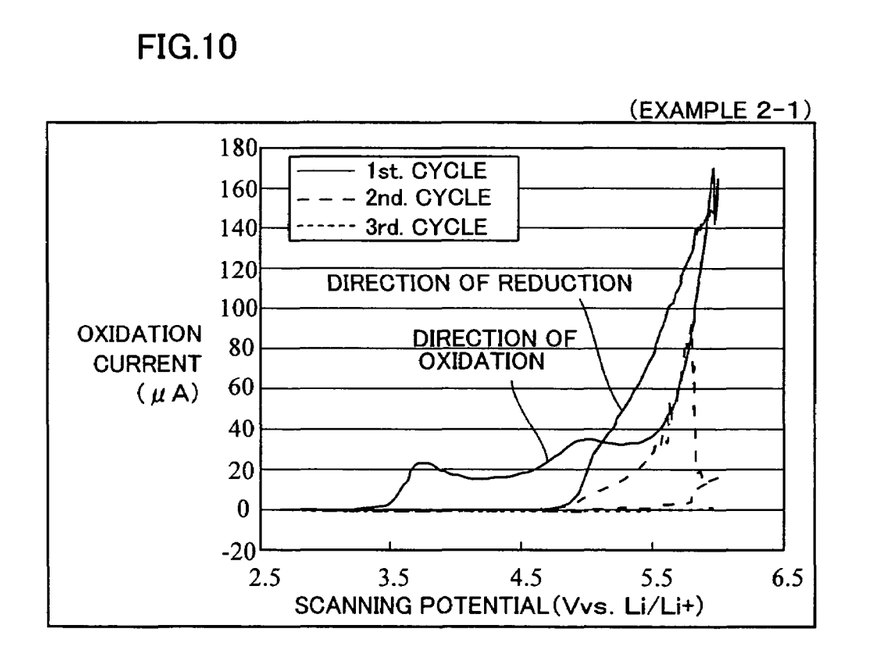
FIG. 10 is a cyclic voltammogram showing the relation between a scanning potential and an oxidation current according to inventive Example 2-1.

Referring to FIG. 10, it has been proved that Example 2-1 which is the combination of the electrolytic solution consisting of EC/DEC in which $LiN(CF_3SO_2)_2$ is dissolved and the collector consisting of the ZrN film can be used only at a low potential, dissimilarly to the aforementioned Example 1-1 (see FIG. 2) employing the collector consisting of the TiN film. In other words, it has been proved that the value of the oxidation current decreases in proportion to the cycles while the value of the oxidation current in the direction of reduction exceeds the value of the oxidation current in the direction of oxidation when the scanning potential is at least 4.8 V vs. $Li/Li^+$ in Example 2-1. It can be said from this result that the ZrN film constituting the collector is eluted in the electrolytic solution consisting of EC/DEC in which $LiN(CF_3SO_2)_2$ is dissolved. However, the oxidation current hardly flows when the scanning potential is not more than 3.4 V vs. $Li/Li^+$. Thus, the combination of the ZrN film employed as the collector and the electrolytic solution consisting of EC/DEC in which $LiN(CF_3SO_2)_2$ is dissolved can conceivably be used at a potential of not more than 3.4 V.

Figure 11:
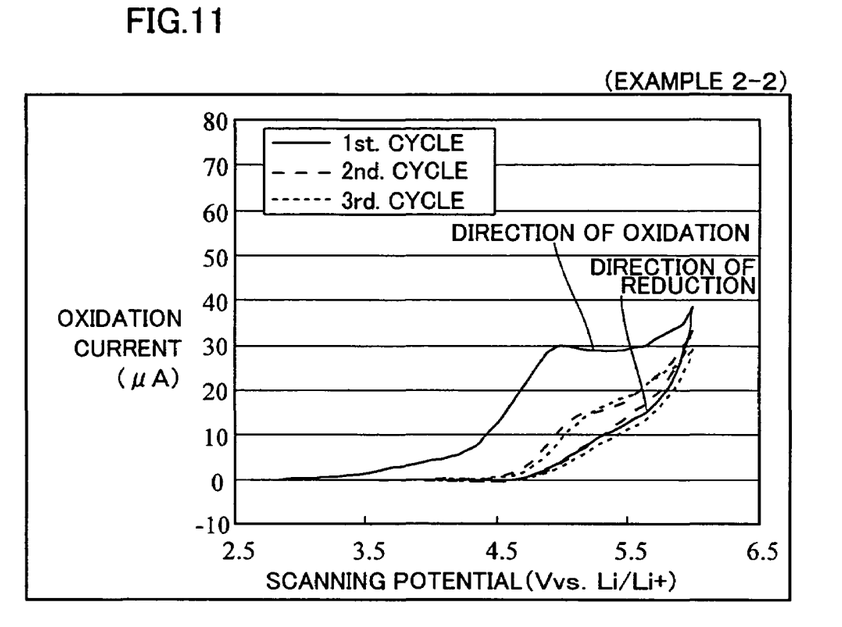
FIG. 11 is a cyclic voltammogram showing the relation between a scanning potential and an oxidation current according to inventive Example 2-2.

Referring to FIG. 11, it has been proved that Example 2-2 which is the combination of the electrolytic solution consisting of EC/DEC in which $LiN(C_2F_5SO_2)_2$ is dissolved and the collector consisting of the ZrN film can be used at a high potential of 6 V, similarly to the aforementioned Example 1-2 (see FIG. 3) employing the collector consisting of the TiN film. In other words, it has been proved that the value of the oxidation current decreases in proportion to the cycles in Example 2-2. It can be said from this result that the ZrN film constituting the collector is hardly eluted in the electrolytic solution consisting of EC/DEC in which $LiN(C_2F_5SO_2)_2$ is dissolved.

Figure 12:
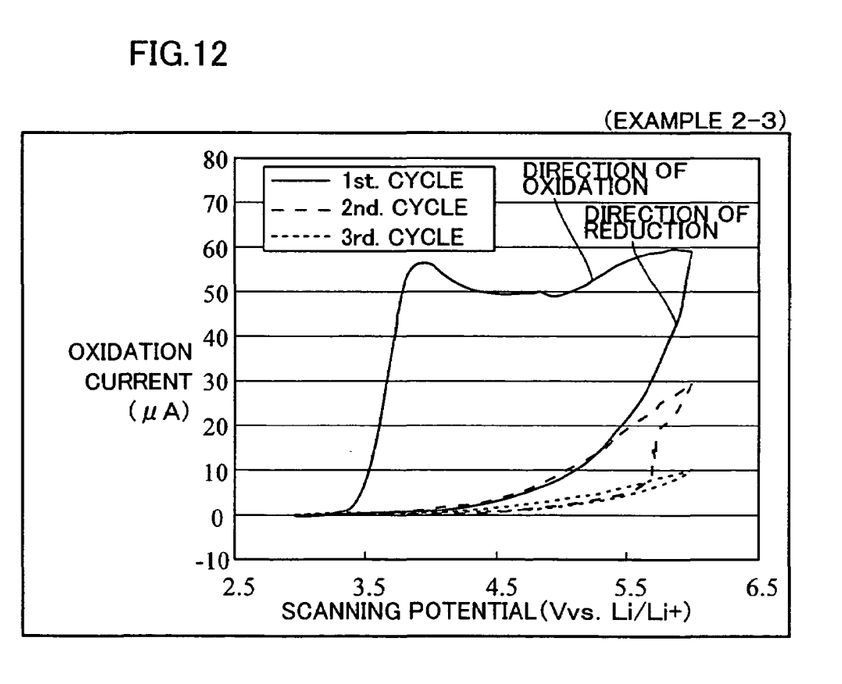
FIG. 12 is a cyclic voltammogram showing the relation between a scanning potential and an oxidation current according to inventive Example 2-3.

Referring to FIG. 12, it has been proved that the Example 2-3 which is the combination of the electrolytic solution consisting of EC/DEC in which $LiPF_6$ is dissolved and the collector consisting of the ZrN film can be used at a high potential of 6 V, dissimilarly to the aforementioned Example 1-3 (see FIG. 4) employing the collector consisting of the TiN film. In other words, it has been proved that the value of the oxidation current decreases in proportion to the cycles in Example 2-3. It can be said from this result that the ZrN film constituting the collector is hardly eluted in the electrolytic solution consisting of EC/DEC in which $LiPF_6$ is dissolved.

Figure 13:
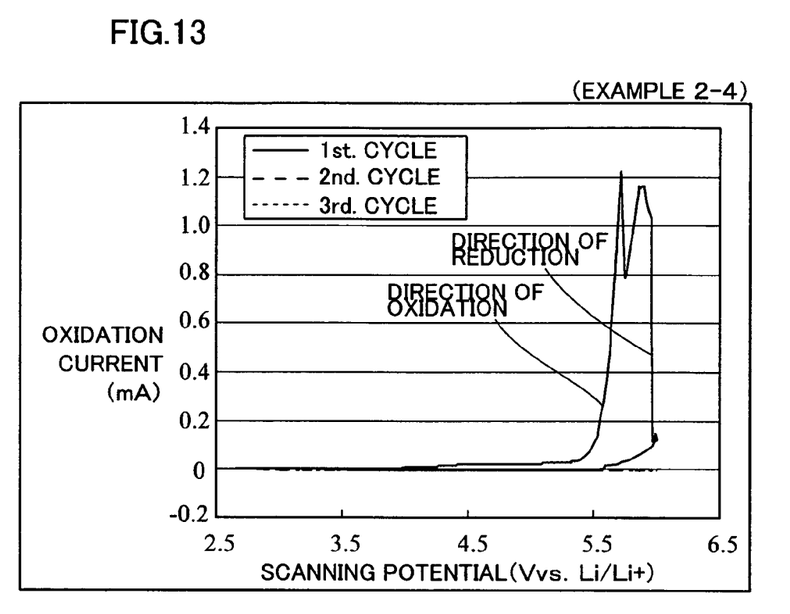
FIG. 13 is a cyclic voltammogram showing the relation between a scanning potential and an oxidation current according to inventive Example 2-4.

Referring to FIG. 13, it has been proved that Example 2-4 which is the combination of the electrolytic solution consisting of EC/DEC in which LiCF$_3$SO$_3$ is dissolved and the collector consisting of the ZrN film can be used only at a low potential, similarly to the aforementioned Example 1-4 (see FIG. 5) employing the collector consisting of the TiN film. In other words, it has been proved that the value of the oxidation current decreases in proportion to the cycles while the value of the oxidation current reaches the order of mA and increases to 1.2 mA at the maximum when the scanning potential exceeds 4.2 V vs. Li/Li$^+$ in Example 2-4. It can be said from this result that the ZrN film constituting the collector is easily eluted in the electrolytic solution consisting of EC/DEC in which LiCF$_3$SO$_3$ is dissolved when the scanning potential exceeds 4.2 V vs. Li/Li$^+$. When the scanning potential is not more than 4.2 V vs. Li/Li$^+$, however, the oxidation current hardly flows. Thus, the combination of the ZrN film employed as the collector and the electrolytic solution consisting of EC/DEC in which LiCF$_3$SO$_3$ is dissolved can conceivably be used at a potential of not more than 4.2 V.

Figure 14:
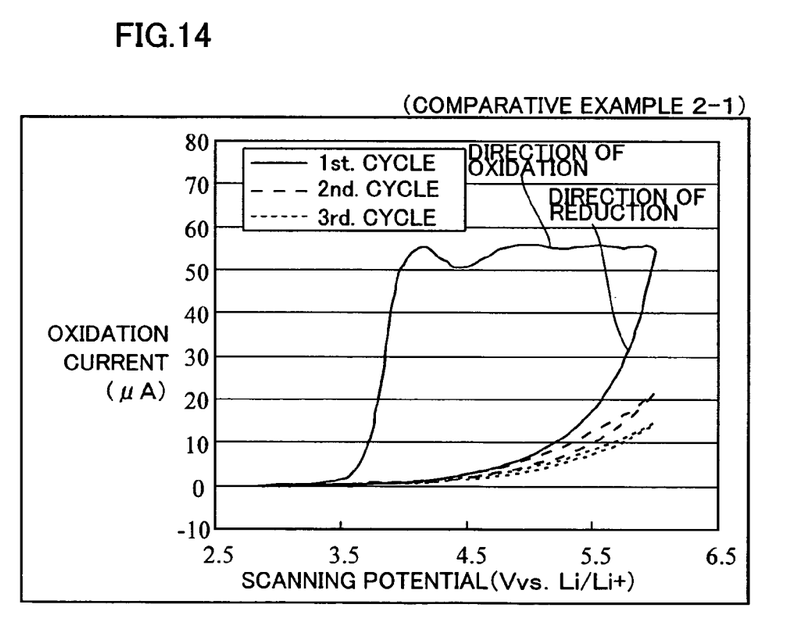
FIG. 14 is a cyclic voltammogram showing the relation between a scanning potential and an oxidation current according to inventive Example 2-5.

Referring to FIG. 14, it has been proved that Example 2-5 which is the combination of the electrolytic solution consisting of EC/DEC in which LiBF$_4$ is dissolved and the collector consisting of the ZrN film can be used at a high potential of 6 V, dissimilarly to Example 1-5 (see FIG. 6) employing the collector consisting of the TiN film. In other words, it has been proved that the value of the oxidation current decreases in proportion to the cycles in Example 2-5. It can be said from this result that the ZrN film constituting the collector is hardly eluted in the electrolytic solution consisting of EC/DEC in which LiBF$_4$ is dissolved.

According to each of Examples 2-1 to 2-5, as hereinabove described, the collector of the positive electrode is so constituted of the ZrN film that it is possible to obtain a collector having excellent collection performance stable in a wide potential range in relation to a plurality of types of electrolytes similarly to the aforementioned Examples 1-1 to 1-5 since ZrN containing Zr (zirconium) which is a transition metal element and N (nitrogen) which is a group 5 element has conductivity and is chemically inert. Further, it is possible to employ LiN(C$_2$F$_5$SO$_2$)$_2$ which is an electrolyte difficult to use in the conventional collector consisting of Al foil at a high potential. Further, an electrolyte such as LiPF$_6$ or LiBF$_4$ which is difficult to use at a high potential in a collector consisting of a TiN film can also be employed at a high potential. Thus, the selection range for electrolytes can be widened also when employing the collector consisting of the ZrN film. In addition, a chemically stable collector can be easily obtained similarly to the aforementioned Examples 1-1 to 1-5, since ZrN is a chemically stable interstitial nitride.

Effects of a preparation process for Examples 2-1 to 2-5 are similar to those of the aforementioned Examples 1-1 to 1-5. In other words, the ZrN film is so formed by sputtering that the same can be formed in a similar thickness to metallic foil generally used as a collector, whereby the ZrN film can be easily employed as the collector. Further, the quantity of impurities contained in the collector can be reduced and adhesion between the substrate 7 and the collector can be improved. In addition, the collector is so formed on the substrate 7 consisting of the polyimide film that an easily deformable positive electrode for a nonaqueous electrolyte battery can be formed since the polyimide film is rich in flexibility and excellent in heat resistance while the substrate 7 can be inhibited from deterioration resulting from rise of the substrate temperature in formation of the ZrN film.

EXAMPLE 3

[Preparation of Collector (Positive Electrode)]

In this Example 3, a collector of a positive electrode employed for a nonaqueous electrolyte battery according to Example 3 was prepared by sputtering similar to that for the aforementioned Examples 1-1 to 1-5. In Example 3, however, a TaN film having a thickness of 0.3 μm was formed on a substrate 7 (see FIG. 1) consisting of a polyimide film under conditions shown in the following Table 3. TaN is an example of the "compound" and the "interstitial nitride" in the present invention.

TABLE 3

| Working Gas Flow Rate | Ar: 50 (sccm) |
| --- | --- |
| | N$_2$: 50 (sccm) |
| Working Gas Pressure | 2.6 × 10$^{-1}$ (Pa) |
| High-Frequency Power | 200 (W) |
| Formation Time | 120 (min) |

Referring to the above Table 3, the forming conditions for the TaN film employed for Example 3 are working gas (atmospheric gas) flow rates: Ar gas (50 sccm) and N$_2$ gas (5 sccm) consisting of N (nitrogen) which is a group 5 element, working gas pressure: 2.6×10$^{-1}$ Pa, high-frequency power applied to target: 200 W and formation time: 120 min. When preparing the collector employed for Example 3, a substance prepared by molding Ta metal containing 99.9% of Ta (tantalum) which is a transition metal element was employed as a target 3 (see FIG. 1). Ta (tantalum) is an example of the "transition metal element" in the present invention.

Then, the following cyclic voltammetry measurement was performed in order to investigate a difference of performance responsive to a combination of the collector according to Example 3 prepared in the aforementioned manner and an electrolytic solution:

[Cyclic Voltammetry Measurement]

In this Example 3, cyclic voltammetry measurement similar to that for the aforementioned Examples 1-1 to 1-5 was performed. In other words, the aforementioned collector (positive electrode) prepared according to Examples was employed as a working electrode, while substance prepared by molding Li metal were employed as a counter electrode (negative electrode) and a reference electrode.

As the electrolytic solution, a substance prepared by dissolving LiPF$_6$ in a constant-volume mixed solvent (EC/DEC (1/1)) of ethylene carbonate (EC) and diethyl carbonate (DEC) to have concentration of 1 mol/liter was employed in Example 3, similarly to the aforementioned Examples 1-3 and 2-3.

The potential scanning range was set to natural potential to 6 V vs. Li/Li$^+$, while an oxidation current flowing between the working electrode consisting of TaN and the counter electrode consisting of Li was measured. A result of this cyclic voltammetry measurement is shown in FIG. 15.

Figure 15:
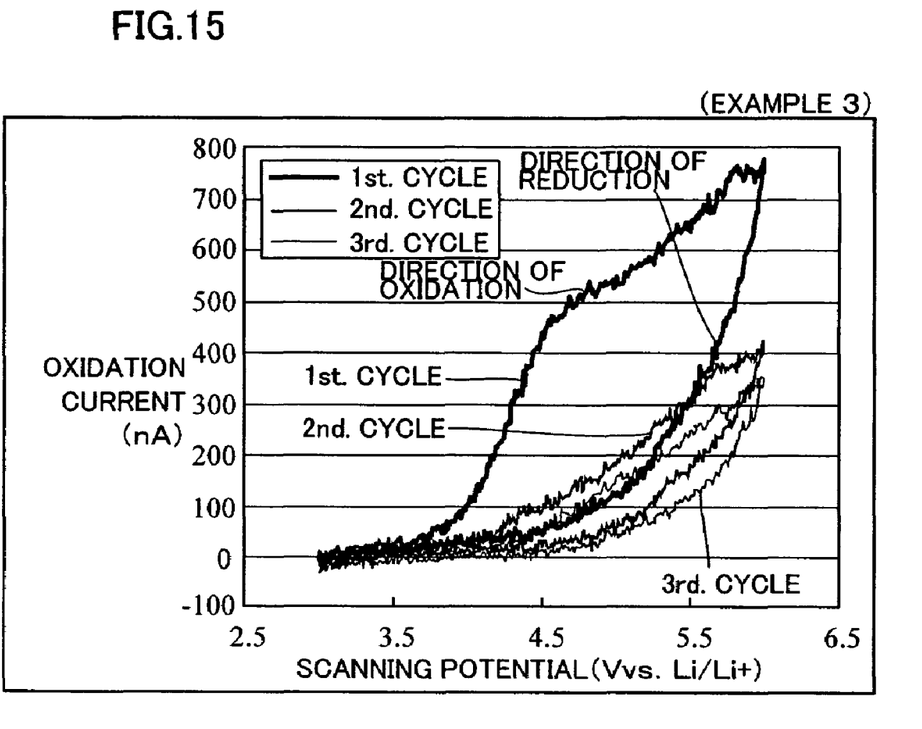
FIG. 15 is a cyclic voltammogram showing the relation between a scanning potential and an oxidation current according to inventive Example 3.

Referring to FIG. 15, it has been proved that Example 3 which is the combination of the electrolytic solution consisting of EC/DEC in which LiPF$_6$ is dissolved and the collector consisting of the TaN film can be used at a high potential of 6 V, dissimilarly to the aforementioned Example 1-3 (see FIG. 4) employing the collector consisting of the TiN film. In other words, it has been proved that the value of the oxidation current decreases in proportion to the cycles in Example 3, similarly to the aforementioned Example 2-3

(see FIG. 12) employing the collector consisting of the ZrN film. It can be said from this result that the TaN film constituting the collector is hardly eluted in the electrolytic solution consisting of EC/DEC in which LiPF$_6$ is dissolved.

According to Example 3, as hereinabove described, the collector of the positive electrode is so constituted of the TaN film that it is possible to obtain a collector having excellent collection performance stable in a wide potential range in a case of employing an electrolyte in which LiPF$_6$ is dissolved since TaN containing Ta (tantalum) which is a transition metal element and N (nitrogen) which is a group 5 element has conductivity and is chemically inert. In other words, the electrolyte in which LiPF$_6$ is dissolved which is difficult to use at a high potential in a collector consisting of a TiN film can be employed at a high potential. Further, a chemically stable collector can be easily obtained similarly to the aforementioned Examples 1-1 to 1-5 and Examples 2-1 to 2-5, since TaN is a chemically stable interstitial nitride.

Effects of a preparation process for Example 3 are similar to those of the aforementioned Examples 1-1 to 1-5 and Examples 2-1 to 2-5. In other words, the TaN film is so formed by sputtering that the same can be formed in a similar thickness to metallic foil generally used as a collector, whereby the TaN film can be easily employed as the collector. Further, the quantity of impurities contained in the collector can be reduced and adhesion between the substrate 7 and the collector can be improved. In addition, the collector is so formed on the substrate 7 consisting of the polyimide film that an easily deformable positive electrode for a nonaqueous electrolyte battery can be formed since the polyimide film is rich in flexibility and excellent in heat resistance while the substrate 7 can be inhibited from deterioration resulting from rise of the substrate temperature in formation of the TaN film.

Examples disclosed this time are to be considered as illustrative in all points and not restrictive. The scope of the present invention is shown not by the above description of Examples but by the scope of claim for patent, and all modifications within the meaning and range equivalent to the scope of claim for patent are included.

For example, while the TiN film, the ZrN film or the TaN film containing Ti (titanium), Zr (zirconium) or Ta (tantalum) which is a transition metal element and N (nitrogen) which is a group 5 element is employed as the collector in each of the aforementioned Examples 1-1 to 1-5, Examples 2-1 to 2-5 and Example 3, the present invention is not restricted to this a compound containing a transition metal element and at least one element among the groups 3, 4 and 5 may be employable.

While the TiN film, the ZrN film or the TaN film which is an interstitial nitride is employed as the collector in each of the aforementioned Examples 1-1 to 1-5, Examples 2-1 to 2-5 and Example 3, the present invention is not restricted to this but a collector consisting of a further interstitial nitride other than TiN, ZrN and TaN may be employed. For example, a nitride containing a rare earth element, HfN, VN, NbN, CrN, UN, ThN$_2$, WN$_2$, MO$_2$N, W$_2$N, Fe$_2$N, Mn$_3$N$_2$, CO$_3$N$_2$ and Ni$_3$N$_2$ etc. can be listed as interstitial nitrides other than TiN, ZrN and TaN.

While the collector is formed on the filmy substrate consisting of polyimide as an example of the filmy substrate in each of the aforementioned Examples 1-1 to 1-5, Examples 2-1 to 2-5 and Example 3, the present invention is not restricted to this but the collector may be formed on another filmy substrate other than the polyimide substrate. For example, filmy substrates consisting of polyethylene, polypropylene, polyethylene terephthalate, poly(vinylidene chloride), polyvinyl chloride and polycarbonate etc. can be listed. However, the filmy substrate consisting of polyimide is particularly preferable since the same is a substrate excellent in flexibility and heat resistance.

While the inventive collector is employed as the collector of the positive electrode in each of the aforementioned Examples 1-1 to 1-5, Examples 2-1 to 2-5 and Example 3, the present invention is not restricted to this but the same may be employed as a collector of a negative electrode. Further, the inventive collector may be employed for each of positive and negative electrodes.

While the collector is formed on the substrate by sputtering in each of the aforementioned Examples 1-1 to 1-5, Examples 2-1 to 2-5 and Example 3, the present invention is not restricted to this but another method may be employed so far as the same is a method supplying raw material from a vapor phase. For example, the collector may be formed on the substrate by PVD such as evaporation or CVD such as plasma CVD.

While the substrate having only the collector formed on the substrate is employed as the positive electrode in each of the aforementioned Examples 1-1 to 1-5, Examples 2-1 to 2-5 and Example 3, the present invention is not restricted to this but a positive electrode active material layer is preferably formed on the collector when employed as a nonaqueous electrolyte battery. When applying the present invention to a lithium secondary battery, a material capable of occluding and discharging lithium can be employed as a positive electrode active material. Oxides having tunnellike holes such as Li$_2$FeO$_3$, TiO$_2$ and V$_2$O$_5$ which are inorganic compounds, metal chalcogen compounds having layer structures such as TiS$_2$ and MOS$_2$ etc. can be listed as materials employable as positive active materials. It is more preferable to employ a composite oxide having a composition formula Li$_x$MO$_2$ ($0 \leq x \leq 1$) or Li$_y$M$_2$O$_4$ ($0 \leq y \leq 2$) as the positive electrode active material. M in the composition formula represents a transition metal. For example, LiCoO$_2$, LiMnO$_2$, LiNiO$_2$, LiCrO$_2$ and LiMn$_2$O$_4$ etc. can be listed as composite oxides having the above composition formula. Further, a partially replaced body of an Li site or a partially replaced body of a transition metal may be employed.

The invention claimed is:
1. A nonaqueous electrolyte battery comprising:
a positive electrode including a collector;
a negative electrode; and
a nonaqueous electrolytic solution,
wherein said collector of said positive electrode comprising:
a polymer film substrate made of polyimide, and
a film comprising a nitride of a transition metal element formed on said polymer substrate, wherein nitrogen atoms filling interstitial sites in a crystal structure of said nitride.

2. A nonaqueous electrolyte battery, comprising:
a positive electrode including a collector;
a negative electrode; and
a nonaqueous electrolytic solution,
wherein said collector of said positive electrode comprising:
   a polymer film substrate made of polyimide, and
   a film comprising a nitride of a transition metal element formed on said polymer substrate, wherein nitrogen atoms filling interstitial sites in a crystal structure of said nitride, and wherein the transition metal element contained in said compound is titanium.

3. The nonaqueous electrolyte battery according to claim 2, wherein
said nonaqueous electrolytic solution includes a nonaqueous electrolytic solution in which at least one solute in $LiN(CF_3SO_2)_2$, $LiN(C_2F_5SO_2)_2$, $LiPF_6$ and $LiBF_4$ is dissolved.

* * * * *